(12) United States Patent
Chang et al.

(10) Patent No.: US 9,208,176 B2
(45) Date of Patent: Dec. 8, 2015

(54) GESTURE-BASED IMAGE SHAPE FILTERING

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 13/796,233

(22) Filed: Mar. 12, 2013

(65) Prior Publication Data

US 2014/0280077 A1    Sep. 18, 2014

(51) Int. Cl.
*G06F 7/04* (2006.01)
*G06F 17/30* (2006.01)
*G06K 9/62* (2006.01)

(52) U.S. Cl.
CPC .... *G06F 17/30277* (2013.01); *G06F 17/30247* (2013.01); *G06F 17/30256* (2013.01); *G06F 17/30259* (2013.01); *G06F 17/30265* (2013.01); *G06F 17/30268* (2013.01); *G06K 9/6202* (2013.01); *G06K 9/6215* (2013.01)

(58) Field of Classification Search
CPC .................. G06F 17/30247; G06F 17/30265; G06F 17/30268; G06F 17/30256; G06F 17/30259; G06F 17/30
See application file for complete search history.

(56) References Cited

U.S. PATENT DOCUMENTS

| 8,296,280 | B2 | 10/2012 | Mo |
| 2002/0168117 | A1 | 11/2002 | Lee et al. |
| 2008/0082426 | A1* | 4/2008 | Gokturk et al. ................. 705/27 |
| 2008/0270478 | A1* | 10/2008 | Liu et al. ..................... 707/104.1 |
| 2009/0171783 | A1* | 7/2009 | Raju ................................ 705/14 |
| 2010/0076959 | A1 | 3/2010 | Ramani et al. |
| 2010/0250539 | A1 | 9/2010 | Zhou et al. |
| 2010/0262616 | A1* | 10/2010 | Eskolin et al. ................ 707/769 |
| 2011/0032145 | A1 | 2/2011 | Hansen et al. |
| 2012/0030152 | A1* | 2/2012 | Pueyo et al. ..................... 706/12 |
| 2012/0054177 | A1 | 3/2012 | Wang et al. |
| 2012/0072410 | A1 | 3/2012 | Wang et al. |

(Continued)

FOREIGN PATENT DOCUMENTS

| WO | 2012094391 A1 | 7/2012 |
| WO | 2012142323 A1 | 10/2012 |

OTHER PUBLICATIONS

Goncalves, P. and M.J. Fonseca, "Combining Multitouch Gestures and Sketches to Explore Photo Collections", 2012 IEEE Symposium on Visual Languages and Human-Centric Computing: Poster and Demos, pp. 251-252, DOI: 10.1109/VLHCC.2012.6344539. [Also Total 2 pp.].

(Continued)

*Primary Examiner* — Bruce Moser
(74) *Attorney, Agent, or Firm* — Janaki K. Davda; Konrad, Raynes, Davda & Victor LLP (57) ABSTRACT

Provided are techniques for gesture-based image shape filtering. At least one keyword in a search request for an image is received. A first set of images that are candidate matches to the requested image are identified based on the at least one keyword. A gesture-based image for a filter request is received. The first set of images are filtered using the gesture-based image to identify a second set of images that are candidate matches to the requested image.

12 Claims, 8 Drawing Sheets

(56) References Cited

U.S. PATENT DOCUMENTS

| 2012/0162244 | A1 | 6/2012 | Ma et al. |
| 2012/0174041 | A1 | 7/2012 | Queru |
| 2012/0197857 | A1 | 8/2012 | Huang et al. |
| 2012/0239642 | A1 | 9/2012 | Bliss et al. |
| 2014/0164406 | A1* | 6/2014 | Petrou .......................... 707/754 |

OTHER PUBLICATIONS

Weisstein, E., "Least Squares Fitting—from Wolfram Math World", [online], [Retrieved on Mar. 4, 2013]. Retrieved from the Internet at <URL: http://mathworld.wolfram.com/LeastSquaresFitting.html>, last updated Mar. 2, 2013, Total 3 pp.

"Round Flower—Google Search", [online], [Retrieved on Mar. 8, 2013]. Retrieved from the Internet at <URL: http://www.google.co.in/search?hl=en&safe=off&output=search&sclient=psy-ab&q=round+flower&oq=round+flower&aq=f&aqi=g4&aql=&gs_1=hp.3..0l4.1311>, Total 1 p.

Preliminary Amendment, Sep. 26, 2014, for U.S. Appl. No. 14/497,988, filed Sep. 26, 2014 by B.W. Chang et al., Total 5 pp. [57.313C1 (PrelimAmend)].

U.S. Appl. No. 14/497,988, filed Sep. 26, 2014, entitled, "Gesture-Based Image Shape Filtering", invented by B.W. Chang et al., Total 27 pp. [57.313C1 (Appin)].

Final Office Action, Apr. 28, 2015, for U.S. Appl. No. 14/497,988, filed Sep. 26, 2014 by B.W. Chang et al., Total 14 pp. [57.313C1 (FOA)].

Response to Final Office Action, Jul. 15, 2015, for U.S. Appl. No. 14/497,988, filed Sep. 26, 2014 by B. W. Chang et al., Total 9 pp. [57.313C1 (RFOA)].

Notice of Allowance, Jul. 31, 2015, for U.S. Appl. No. 14/497,988, filed on Sep. 26, 2014 by B.W. Chang et al., Total 20 pp.

* cited by examiner

GESTURE-BASED IMAGE SHAPE FILTERING

FIELD

Embodiments of the invention relate to gesture-based image shape filtering.

BACKGROUND

While searching for an image, a user may provide a search request via text input. Then, in response to the search request, search results for images that are possible matches to the desired image are displayed.

Some systems allow a user to submit a sketch of an image and attempt to locate the desired image based on the sketch. For example, a sketch of a circle (e.g., a round shaped object) may result in images for a ball, a circular building, a flower, furniture, food, etc. being returned.

SUMMARY

Provided is a method for gesture-based image shape filtering. At least one keyword in a search request for an image is received using a processor of a computer. A first set of images that are candidate matches to the requested image are identified, using the processor of the computer, based on the at least one keyword. A gesture-based image for a filter request is received using the processor of the computer. The first set of images are filtered, using the processor of the computer, using the gesture-based image to identify a second set of images that are candidate matches to the requested image.

Also, provided is a computer program product for gesture-based image shape filtering. The computer program product comprises a computer readable storage medium having program code embodied therewith, the program code executable by at least one processor to: receive at least one keyword in a search request for an image, identify a first set of images that are candidate matches to the requested image based on the at least one keyword, receive a gesture-based image for a filter request, and filter the first set of images using the gesture-based image to identify a second set of images that are candidate matches to the requested image.

Moreover, provided is a computer system for gesture-based image shape filtering. The computer system includes one or more processors, one or more computer-readable memories and one or more computer-readable, tangible storage devices, and program instructions, stored on at least one of the one or more computer-readable, tangible storage devices for execution by at least one of the one or more processors via at least one of the one or more memories, to: receive at least one keyword in a search request for an image, identify a first set of images that are candidate matches to the requested image based on the at least one keyword, receive a gesture-based image for a filter request, and filter the first set of images using the gesture-based image to identify a second set of images that are candidate matches to the requested image.

BRIEF DESCRIPTION OF THE SEVERAL VIEWS OF THE DRAWINGS

In the drawings, like reference numbers represent corresponding parts throughout.

FIG. 3 illustrates, in a flow diagram, operations for identifying one or more images in accordance with certain embodiments. FIG. 3 is formed by FIGS. 3A and 3B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
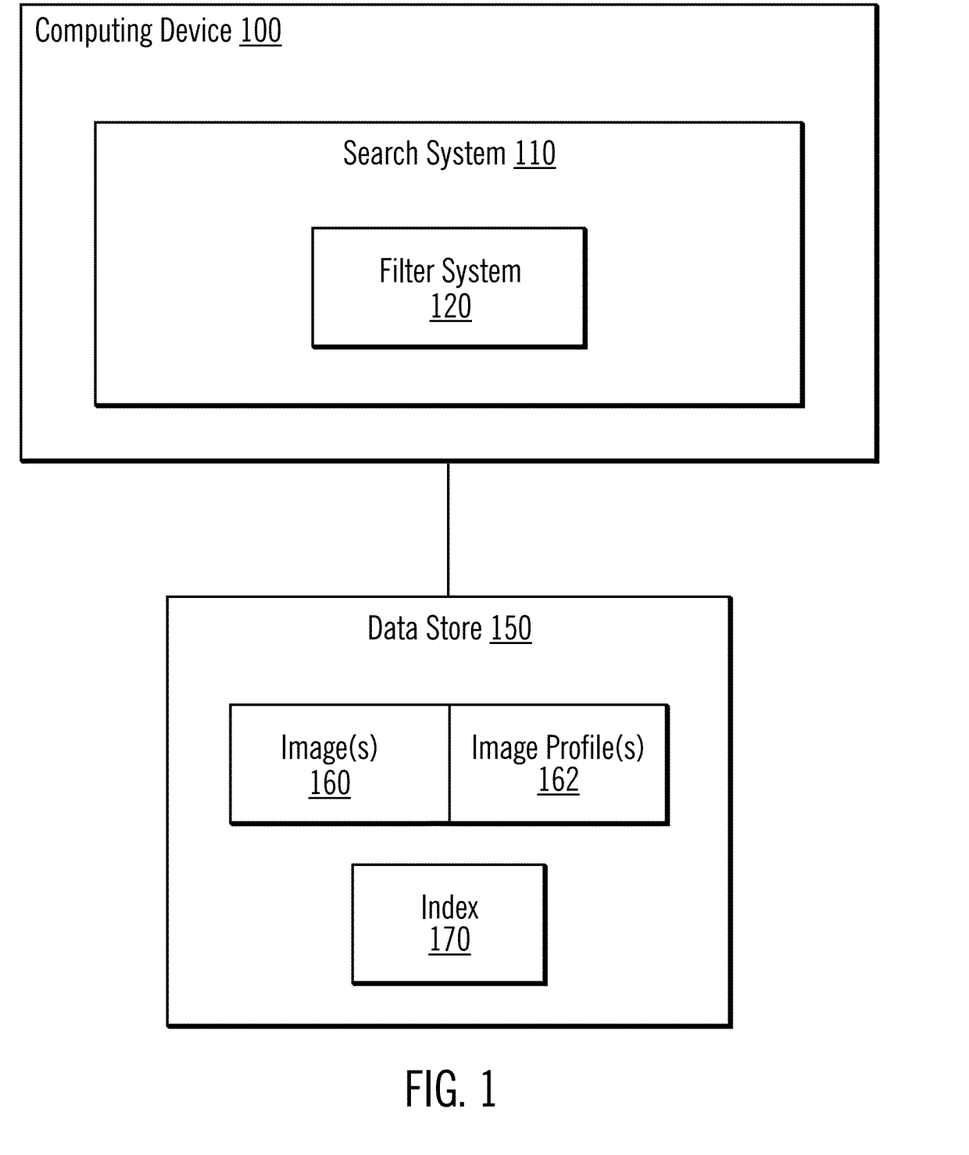
FIG. 1 illustrates a computing environment in accordance with certain embodiments.

FIG. 1 illustrates a computing environment in accordance with certain embodiments. In FIG. 1, a computing device 100 includes a search system 110. The search system 110 includes a filter system 120. The computing device 100 is coupled to a data store 150. The data store 150 stores one or more images 160, one or more image profiles 162, and an index 170.

With embodiments, an image profile 162 is stored for each image 160 (either together or separately). In certain embodiments, the image profile 162 may include one or more of: a radius, a circumference, edge information, and contour. The image profile 162 is used to store information for the image 160 in the index 170 for easier location of the image 162.

With embodiments, a user may input a gesture-based image (e.g., a sketch or a pattern) using, for example, a touch-based interface (e.g., a computer having a touch screen). The user may use a finger, stylus, etc. to input the gesture-based image. The filter system 120 generates an image profile for the gesture-based image, compares the generated image profile to stored image profiles for other images to identify one or more candidate (e.g., possible) matches to the gesture-based image.

Figure 2:
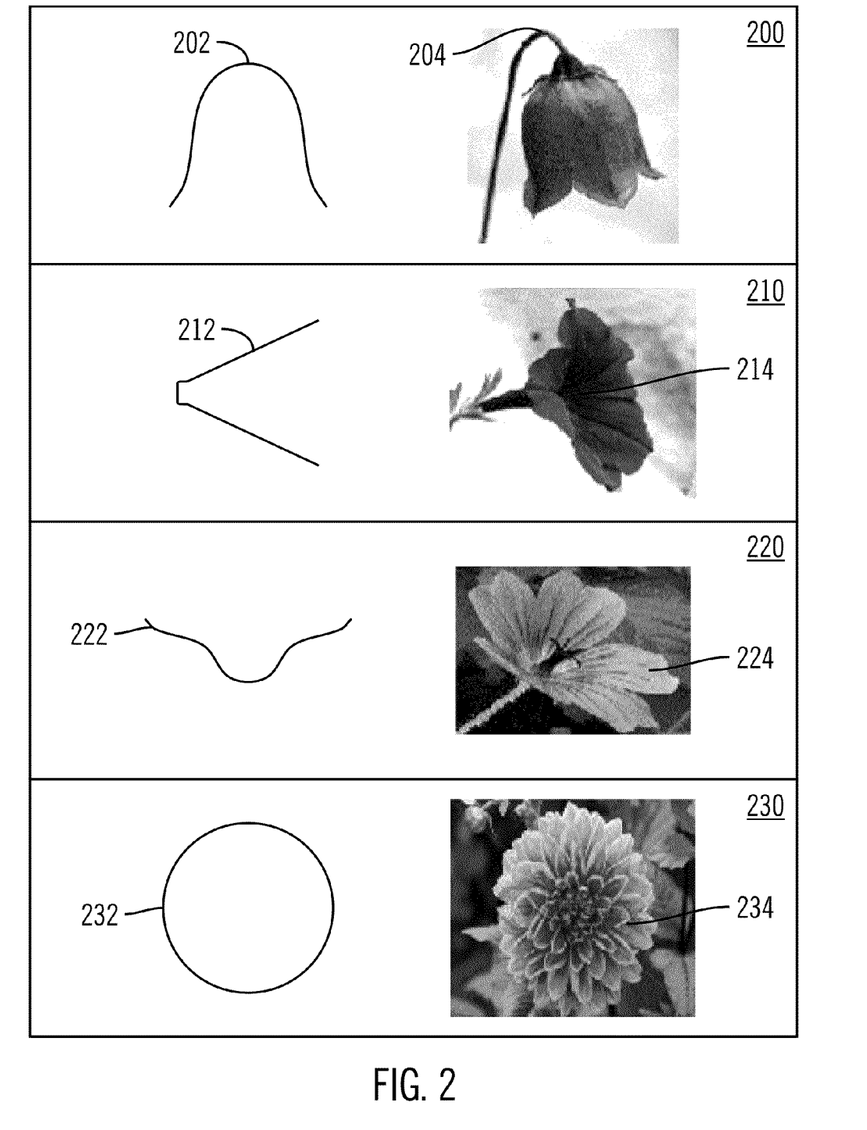
FIG. 2 illustrates pairs of gesture-based images and associated images in accordance with certain embodiments.

FIG. 2 illustrates pairs 200, 210, 220, 230 of gesture-based images and associated images in accordance with certain embodiments. For this example, a user is searching for images of a particular flower. Flowers are of different shapes, and there are some shapes that are not easy to describe with text input (e.g., at least one keyword) or voice input. As an example, even if there was a specific name for the shape of the particular flower, the user may not know the specific name of the shape. In FIG. 2, there are flowers 204, 214, 224, 234 in different shapes, and, with embodiments, the user is able to enter a gesture-based image 202, 212, 222, 232 to try to locate the associated flower 204, 214, 224, 234.

Figure 3A:
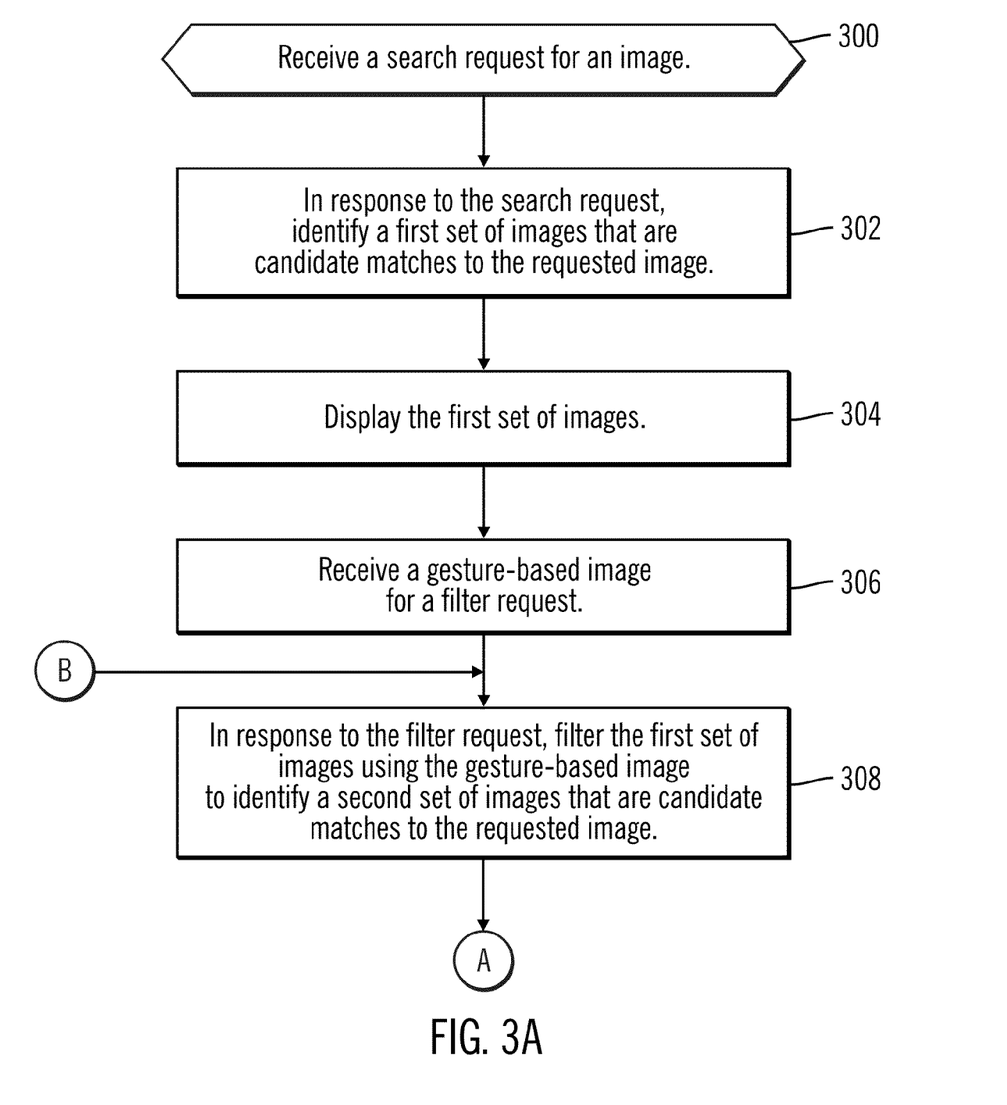
Figure 3B:
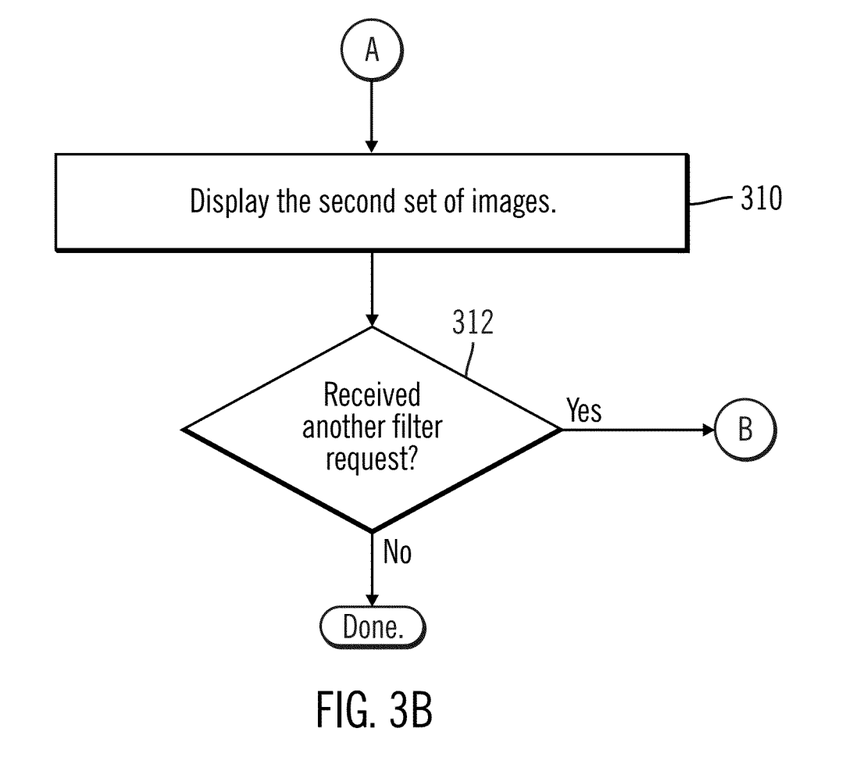

FIG. 3 illustrates, in a flow diagram, operations for identifying one or more images in accordance with certain embodiments. FIG. 3 is formed by FIGS. 3A and 3B. Control begins at block 300 with the search system 110 receiving a search request for an image. The search request may be by text input, voice input, and/or with a gesture-based image. In block 302, in response to the search request, the search system 110 identifies a first set of images that are candidate matches to the requested image. In certain embodiments, the search system 110 and/or the filter system 120 queries one or more data stores (e.g., one or more different data sources) to obtain the first set of images. In block 304, the search system 110 displays the first set of images. In block 306, the filter system 120 receives a gesture-based image for a filter request. In block 308, in response to the filter request, the filter system 120 filters the first set of images using the gesture-based image to identify a second set of images (which are a subset of the first set of images) that are candidate matches to the requested image. From block 308 (FIG. 3A), processing continues to block 310 (FIG. 3B).

In block 310, the filter system 120 displays the second set of images. In block 312, the filter system 120 determines whether another filter request has been received. If so, processing continues to block 308 (FIG. 3A), otherwise, processing ends. Thus, a user may create a new gesture-based image, and the filter system 120 re-filters the current set of images based on the new gesture-based image.

In certain embodiments, there is an initial text based image search followed by gesture-based image filtering. For example, if a user issues a search request with text input of "flower", a first set of images are displayed. Then, if the user submits a gesture-based image (e.g., draws a circle), the first set of images are filtered to provide a second set of images. The filtering is based on comparing image profiles of the requested gesture-based image and the images in the first set of images.

Figure 4:
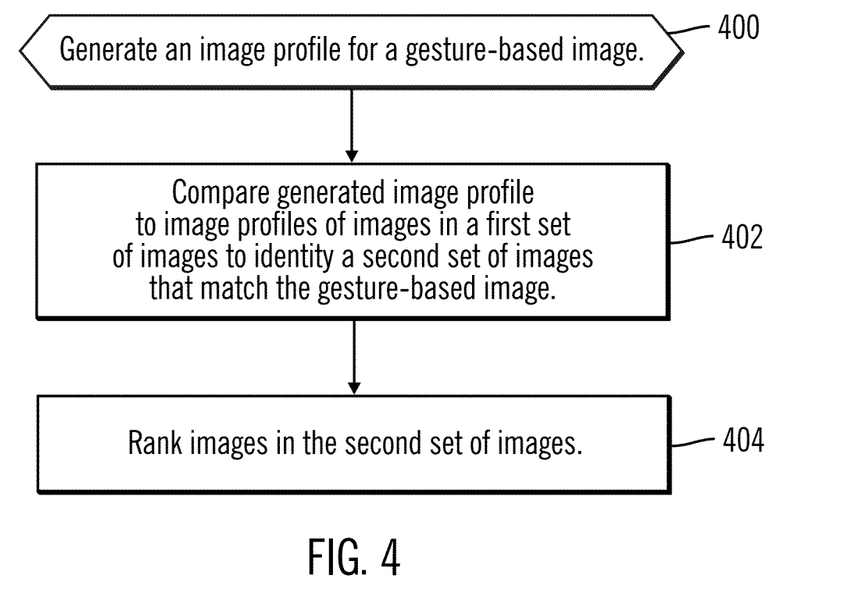
FIG. 4 illustrates, in a flow diagram, operations performed to obtain images based on a gesture-based image.

FIG. 4 illustrates, in a flow diagram, operations performed to obtain images based on a gesture-based image. Control begins at block 400 with the filter system 120 generating an image profile for the gesture-based image. In block 402, the filter system 120 compares the generated image profile to image profiles of candidate images (e.g., the images in the first set of images found in block 302 of FIG. 3A) to identity a second set of images that match the gesture-based image. In block 404, the filter system 120 ranks the images in the second set based on various factors that indicate how closely the generated image profile for the gesture-based image and the stored image profiles for the candidate images match. For example, if edge matching is used for comparison of image profiles, then, an image in the second set matching more edges to the requested image is ranked higher than an image in the second set matching fewer edges to the requested image. In certain embodiments, the filter system 120 uses a least squares technique to identify which images are closer to the gesture-based image, with more similar patterns being given higher ranking.

In certain embodiments, to generate the image profile for the requested gesture-based image, the filter system 120 captures different touch points of the gesture-based image and creates an equation of a shape based on a distance between two adjacent, incremental points of the gesture-based image. In certain embodiments, at an initial touch point, there may be many adjacent touch points, so embodiments use some incremental distance apart and then perform the least square technique.

Figure 5:
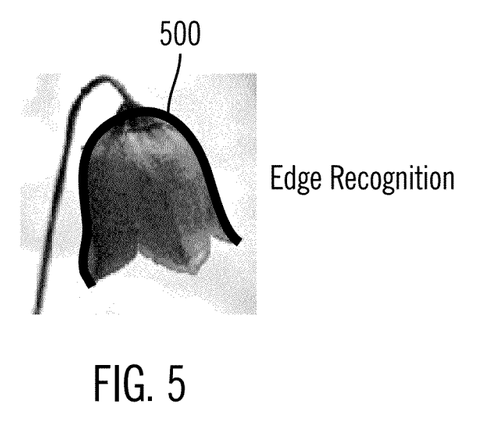
FIG. 5 illustrates an edge on an image in accordance with certain embodiments.

In certain embodiments, for stored images, the filter system 120 computes the image profiles and stores the image profiles. In certain embodiments, the image profiles describe edges of the image, where the edges form a shape. FIG. 5 illustrates an edge 500 on an image in accordance with certain embodiments.

In certain embodiments, for the gesture-based image, the filter system 120 discovers shapes based on edges found from the gesture-based image. Next, based on image edge recognition techniques, the filter system 120 identifies the shapes of any stored image objects that may match the shape of the gesture-based image.

In certain embodiments, if more than one image is discovered that matches the gesture-based image, then the filter system 120 computes an image profile based on shape dimensions of a shape of in each image. A shape dimension may be described as a feature or measurement of an image. Shape dimensions include, but are not limited to, location of the shape, orientation of the shape, and distance between reference points of the shape, etc.

As an example, if the user wants to search for a flower, then the user may enter text input of "flower", and this will return search results of flowers. Next, the user may enter a gesture-based image, and the filter system 120 returns filtered search results. The filter system 120 determines directional parameters from the gesture-based image. Continuing with the example, if the user enters a gesture-based patter of a "U", then tulips may be returned, while, if the user enters a gesture-based image of an inverted "U", snow drops may be returned.

Figure 6:
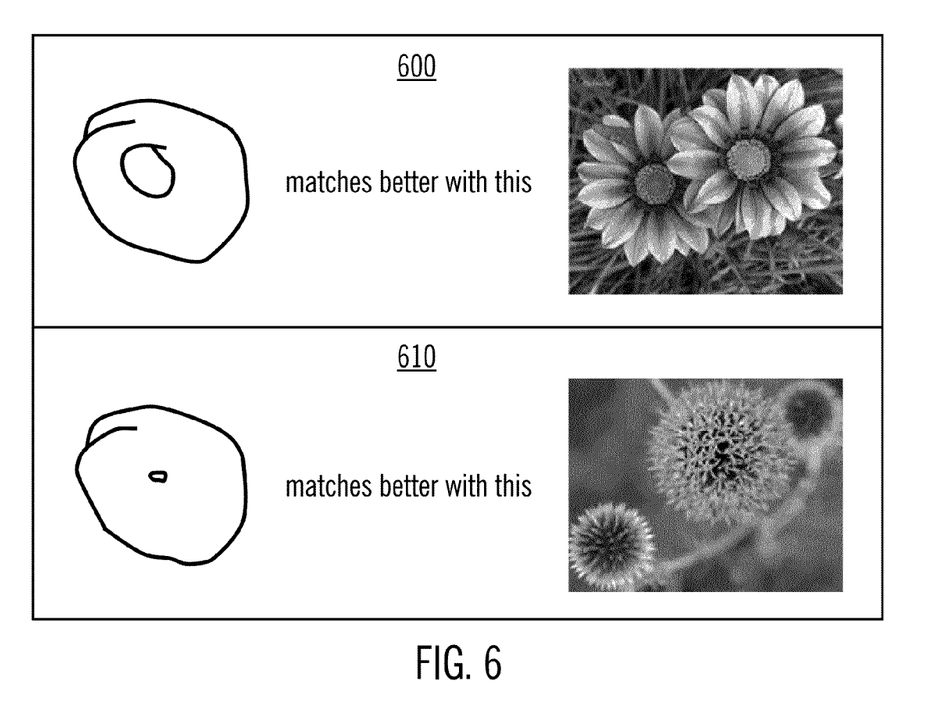
FIG. 6 illustrates matches of flowers to gesture-based images in accordance with certain embodiments.

In certain embodiments, since shape dimensions from images are relative to each other, the filter system 120 may use the ratio of shape dimensions between shapes to provide accurate image matching. FIG. 6 illustrates matches of flowers to gesture-based images in accordance with certain embodiments. For example, in FIG. 6, pair 600 illustrates that a larger circle within a circle gesture-based image matches one type of flower, while pair 610 illustrates that a smaller circle within a circle matches another type of flower.

In certain embodiments, the filter system 120 identifies shape dimensions. In certain embodiments, a user may specify shape dimensions. As another example, if a curve and a circle are identified, then the shape dimensions of the curve may be a radius ($r1$) and a perimeter ($p1$), while the shape dimension of the circle is a radius ($r2$). The filter system 120 may apply a quotient dot product operation against these two shapes so that the equation ($[r1, p1]/[r2]$) results in 2 ratio values ($[r1/r2, p1/r2]$). Then, the filter system 120 stores the images along with the image profile and indexes the images accordingly. In certain embodiments, the images are indexed based on the image profiles.

In certain embodiments, when a user is searching for an image, the user provides keywords for a query (e.g., "flower") and receives a first set of search results. Then, for filtering, with finger gestures, the user draws one or more shapes as part of the image query submission. Now, the filter system 120 computes an image profile query in a similar manner for processing an image and queries an index along with the keywords. In certain embodiments, the filter system may rank images based on the closest keyword and image profile matches from the index and return a list of ranked images.

In certain embodiments, if the list of images is large, the user may optionally refine the image ranking by providing additional gesture-based shapes. As shapes are being drawn, the filter system 120 adjusts the image ranking dynamically to provide interactive feedback to allow drill down to a desired image.

Thus, with various embodiments, the user of a gesture-based image may be used as part of the initial query (e.g., with text input) and/or as filtering of a result set of images from the initial query.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 7:
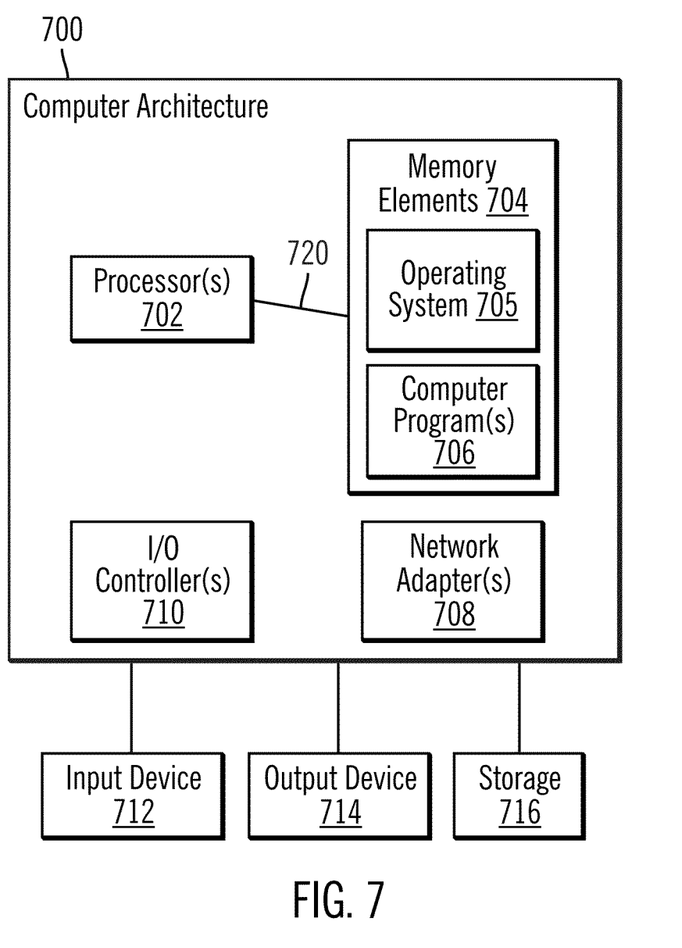
FIG. 7 illustrates, in a block diagram, a computer architecture that may be used in accordance with certain embodiments.

FIG. 7 illustrates a computer architecture 700 that may be used in accordance with certain embodiments. In certain embodiments, computing device 100 may implement computer architecture 700. The computer architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The computer architecture 700 may be coupled to storage 716 (e.g., any type of storage device; a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The computer architecture 700 may include fewer components than illustrated, additional components not illustrated herein, or some combination of the components illustrated and additional components. The computer architecture 700 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A computer program product, the computer program product comprising a non-transitory computer readable storage medium having program code embodied therewith, the program code executable by at least one processor to:
   receive, by the at least one processor, at least one keyword in a search request for an image;
   identify, by the at least one processor, a first set of images that are candidate matches to the requested image based on the at least one keyword, wherein each of the images in the first set of images has an image profile;

receive, by the at least one processor, a first gesture-based image for a filter request;

generate, by the at least one processor, new image profile based on the first gesture-based image;

filter, by the at least one processor, the first set of images to identify a second set of images that are candidate matches to the first gesture-based image by comparing the new image profile with each image profile of the images in the first set of images;

rank, by the at least one processor, the second set of images based on a closest matching keyword from the at least one keyword and based on each image profile of the images in the first set of images; and in response to receiving a second gesture-based image, refine, by the at least one processor, the ranking of the second set of images.

2. The computer program product of claim 1, wherein the program code is executable by at the least one processor to:

receive, by the at least one processor, a third gesture-based image with the at least one keyword; and identify, by the at least one processor, a third set of images that are candidate matches to the requested image based on the at least one keyword and the third gesture-based image.

3. The computer program product of claim 1, wherein the program code is executable by the at least one processor to:

receive, by the at least one processor, a third gesture-based image; and filter, by the at least one processor, the second set of images using the third gesture-based image to identify a third set of images that are candidate matches to the third gesture-based image.

4. The computer program product of claim 1, wherein filtering comprises using edge comparison techniques.

5. The computer program product of claim 1, wherein the program code is executable by the at least one processor to:

create, by the at least one processor, an equation based on a distance between two adjacent, incremental points of the first gesture-based image.

6. The computer program product of claim 1, wherein the program code is executable by the at least one processor to:

store, by the at least one processor, information from each stored image profile of the images in the first set of images in an index.

7. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to:

receive at least one keyword in a search request for an image;

identify a first set of images that are candidate matches to the requested image based on the at least one keyword, wherein each of the images in the first set of images has an image profile;

receive a first gesture-based image for a filter request;

generate a new image profile based on the first gesture-based image;

filter the first set of images to identify a second set of images that are candidate matches to the first gesture-based image by comparing the new image profile with each image profile of the images in the first set of images;

rank the second set of images based on a closest matching keyword from the at least one keyword and based on each image profile of the images in the first set of images; and in response to receiving a second gesture-based image, refine the ranking of the second set of images.

8. The computer system of claim 7, wherein the program instructions are stored on at least one of the one or more computer-readable, tangible storage devices for execution by at least one of the one or more processors via at least one of the one or more memories to:

receive a third gesture-based image with the at least one keyword; and identify a third set of images that are candidate matches to the requested image based on the at least one keyword and the third gesture-based image.

9. The computer system of claim 7, wherein the program instructions are stored on at least one of the one or more computer-readable, tangible storage devices for execution by at least one of the one or more processors via at least one of the one or more memories to:

receive a third gesture-based image; and filter the second set of images using the third gesture-based image to identify a third set of images that are candidate matches to the requested image.

10. The computer system of claim 7, filtering comprises using edge comparison techniques.

11. The computer system of claim 7, wherein the program instructions are stored on at least one of the one or more computer-readable, tangible storage devices for execution by at least one of the one or more processors via at least one of the one or more memories to:

create an equation based on a distance between two adjacent, incremental points of the first gesture-based image.

12. The computer system of claim 7, wherein the program instructions are stored on at least one of the one or more computer-readable, tangible storage devices for execution by at least one of the one or more processors via at least one of the one or more memories to:

store information from each image profile of the images in the first set of images in an index.

* * * * *